(12) United States Patent
Shin et al.

(10) Patent No.: US 8,868,098 B2
(45) Date of Patent: Oct. 21, 2014

(54) METHOD AND SYSTEM FOR PROVIDING SERVICE INFORMATION USING LOCATION INFORMATION

(75) Inventors: Dong Jun Shin, Seoul (KR); Kyoung Taek Kim, Seongnam-si (KR); Hyun Kyoung Kim, Seoul (KR); Hyang Ah Kim, Seongnam-si (KR); Jin Yong Kim, Seoul (KR)

(73) Assignee: Samsung Electronics, Co., Ltd., Suwon-si (KR)

( * ) Notice: Subject to any disclaimer, the term of this patent is extended or adjusted under 35 U.S.C. 154(b) by 177 days.

(21) Appl. No.: 12/481,214

(22) Filed: Jun. 9, 2009

(65) Prior Publication Data
US 2009/0305725 A1 Dec. 10, 2009

(30) Foreign Application Priority Data
Jun. 10, 2008 (KR) .................. 10-2008-0054288

(51) Int. Cl.
| | |
|---|---|
| H04M 11/04 | (2006.01) |
| H04L 29/06 | (2006.01) |
| H04W 24/00 | (2009.01) |
| H04W 4/02 | (2009.01) |
| H04L 29/08 | (2006.01) |
| H04W 4/20 | (2009.01) |

(52) U.S. Cl.
CPC .............. *H04W 4/02* (2013.01); *H04L 67/18* (2013.01); *H04W 4/20* (2013.01)
USPC ............... 455/456.1; 455/404.2; 455/414.3; 455/456.3

(58) Field of Classification Search
USPC .......... 455/404.2, 412.1, 414.3, 456.1, 456.3, 455/420, 432.3, 456.2, 456.5
See application file for complete search history.

(56) References Cited

U.S. PATENT DOCUMENTS

| | | | | |
|---|---|---|---|---|
| 6,879,838 | B2* | 4/2005 | Rankin et al. | 455/456.6 |
| 7,024,205 | B1* | 4/2006 | Hose | 455/456.1 |
| 7,236,799 | B2* | 6/2007 | Wilson et al. | 455/456.3 |
| 7,386,318 | B2* | 6/2008 | Moon et al. | 455/456.3 |
| 7,589,628 | B1* | 9/2009 | Brady, Jr. | 340/539.11 |
| 7,933,897 | B2* | 4/2011 | Jones et al. | 707/723 |
| 7,945,475 | B2* | 5/2011 | Jacobi et al. | 705/14.53 |
| 2002/0111154 | A1* | 8/2002 | Eldering et al. | 455/414 |
| 2005/0015307 | A1* | 1/2005 | Simpson et al. | 705/26 |
| 2005/0255861 | A1* | 11/2005 | Wilson et al. | 455/456.2 |
| 2007/0106721 | A1* | 5/2007 | Schloter | 709/200 |
| 2007/0264968 | A1* | 11/2007 | Frank et al. | 455/404.2 |
| 2008/0172173 | A1* | 7/2008 | Chang et al. | 701/207 |

(Continued)

FOREIGN PATENT DOCUMENTS

| | | |
|---|---|---|
| KR | 1020060124357 | 12/2006 |
| KR | 1020080038968 | 5/2008 |

*Primary Examiner* — Kent Chang
*Assistant Examiner* — Nelson Rosario
(74) *Attorney, Agent, or Firm* — H.C. Park & Associates, PLC (57) ABSTRACT

The present invention relates to a method and system to provide service information to a portable terminal based on the location information associated with the portable terminal. The service information providing method is performed in such a way that a server acquires location information associated with the portable terminal and service information corresponding to the location information. The portable terminal may acquire and store the service information from the server. The portable terminal user can also identify new service information regarding a place where the user is located.

15 Claims, 8 Drawing Sheets

| LOCATION | TYPE OF SERVICE | DETAILED INFO | WEIGHT |
|---|---|---|---|
| AVENUE 1 | STORES & RESTAURANTS | COSMETIC STORE, A | 5 |
| | | CLOTHING SECTION, B | 1 |
| | | SPAGHETTI SPECIALIZING STORE, C | 8 |
| | | RESTAURANT, D | 1 |
| | | CHINESE RESTAURANT, E | 0 |
| | | ⋮ | ⋮ |
| | PERFORMANCES | THEATER, K | 1 |
| | | THEATER, Z | 4 |
| | | ⋮ | ⋮ |
| | EVENTS | 10% OFF FOR COUPLES; STEAK STORE, P | 3 |
| | | PURCHASING BONUS ARTICLE OFFERED; ACCESSORY STORE, L | 1 |
| | | ⋮ | ⋮ |
| | COUPONS | 10% DISCOUNT COUPON; COFFEE CAFE, S | 10 |
| | | 10% DISCOUNT COUPON; MOVIE THEATER, U | 2 |
| | | ⋮ | ⋮ |
| AVENUE 2 | ⋮ | ⋮ | ⋮ |

(56) References Cited

U.S. PATENT DOCUMENTS

2008/0318597 A1* 12/2008 Berns et al. ............... 455/456.5
2009/0005076 A1* 1/2009 Forstall et al. ............. 455/456.2
2009/0019033 A1* 1/2009 Lee et al. ......................... 707/5
2010/0100541 A1* 4/2010 Tsuzuki et al. ............... 707/730

* cited by examiner

| LOCATION | TYPE OF SERVICE | DETAILED INFO | WEIGHT |
|---|---|---|---|
| AVENUE 1 | STORES & RESTAURANTS | COSMETIC STORE, A | 5 |
| | | CLOTHING SECTION, B | 1 |
| | | SPAGHETTI SPECIALIZING STORE, C | 8 |
| | | RESTAURANT, D | 1 |
| | | CHINESE RESTAURANT, E | 0 |
| | | ⋮ | ⋮ |
| | PERFORMANCES | THEATER, K | 1 |
| | | THEATER, Z | 4 |
| | | ⋮ | ⋮ |
| | EVENTS | 10% OFF FOR COUPLES; STEAK STORE, P | 3 |
| | | PURCHASING BONUS ARTICLE OFFERED; ACCESSORY STORE, L | 1 |
| | | ⋮ | ⋮ |
| | COUPONS | 10% DISCOUNT COUPON; COFFEE CAFE, S | 10 |
| | | 10% DISCOUNT COUPON; MOVIE THEATER, U | 2 |
| | | ⋮ | ⋮ |
| AVENUE 2 | ⋮ | ⋮ | ⋮ |
| ⋮ | | ⋮ | ⋮ |

METHOD AND SYSTEM FOR PROVIDING SERVICE INFORMATION USING LOCATION INFORMATION

CROSS REFERENCE TO RELATED APPLICATION

This application claims priority from and the benefit of Korean Patent Application No. 10-2008-0054288, filed on Jun. 10, 2008, which is hereby incorporated by reference for all purposes as if fully set forth herein.

BACKGROUND OF THE INVENTION

1. Field of the Invention

Embodiments of the present invention relate to location information processing technology, and more particularly, to a method and system that can provide corresponding service information to a portable terminal, using location information associated with the portable terminal.

2. Description of the Background

In general, portable terminals may refer to portable devices that can perform wireless communication, and can provide a variety of functions using application programs. Examples of a portable terminal include, but are not limited to, a personal mobile communication service terminal, a personal digital assistant (PDA), a smart phone, an international mobile telecommunication 2000 (IMT-2000) terminal, and a wireless LAN terminal.

In recent years, portable terminals have become small, lightweight devices and include composite communication terminals having a variety of functions, such as an MP3 player, a camera, and/or a navigator. Furthermore, portable terminals can connect to the Internet, so that a portable terminal user can search for and acquire desired information over the Internet. For example, if the portable terminal user wishes to acquire information related to a place where the user is currently located (e.g., information regarding restaurants, etc.), the user can directly access and search the Internet through the portable terminal and acquire corresponding information.

The conventional service providing method and system, however, is disadvantageous in that, whenever the user wishes to acquire the corresponding information, the user must repeatedly access the Internet and input information regarding the user's current location thereto. In addition, although the user wishes to re-access information for which the user has frequently and repeatedly searched, the conventional method and system requires the user to re-input the information.

SUMMARY OF THE INVENTION

Exemplary embodiments of the present invention have been made in view of the above problems, and provide a method and system that can automatically provide service information to a portable terminal based on location information associated with the portable terminal.

Exemplary embodiments of the present invention further provide a method and system that can analyze pieces of service information used by a user of a portable terminal and can provide, to the user, a piece of service information that the user frequently uses at the user's current location.

Additional features of the exemplary embodiments of the invention will be set forth in the description which follows, and in part will be apparent from the description, or may be learned by practice of the exemplary embodiments of the invention.

An exemplary embodiment of the present invention discloses a method for providing service information. The method comprises acquiring, by a server, location information associated with a portable terminal periodically and acquiring, by the server, the service information corresponding to the location information from at least one service provider. The method further comprises transmitting, to the portable terminal, by the server, the service information. The service information is stored in the portable terminal.

Another exemplary embodiment of the present invention discloses a system for providing service information. The system comprises a portable terminal and a server. The server periodically receives location information associated with the portable terminal, acquires the service information corresponding to the location information, and transmits the service information to the portable terminal.

Another exemplary embodiment of the present invention discloses a portable terminal comprising a location identifying unit and a service information managing unit. The location identifying unit periodically acquires location information associated with a current location of the portable terminal and transmits the location information to a server. The service information managing unit stores service information transmitted from the server in response to the location information, and displays the service information in a list, according to a request of a user of the portable terminal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF ILLUSTRATED EMBODIMENTS

Hereinafter, exemplary embodiments of the present invention are described in detail with reference to the accompanying drawings. The same reference numbers are used throughout the drawings to refer to the same or similar parts. Detailed descriptions of well-known functions and structures incorporated herein may be omitted to avoid obscuring the subject matter of the exemplary embodiments of the present invention.

The terms or words described in the following description and the claims should not be limited by a general or lexical meaning, instead should be analyzed as a meaning and a concept through which the present invention may be defined and described. Therefore, one skilled in the art should understand that the exemplary embodiments disclosed in the description and configurations illustrated in the drawings are preferred embodiments, and that there may be various modifications, alterations, and equivalents thereof to replace the exemplary embodiments at the time of filing this application.

Prior to explaining the exemplary embodiments of the present invention, relevant terminology will be defined for the description below:

A 'location coordinate' may refer to data regarding a location where a portable terminal is currently located. The location coordinate may be data including latitude, longitude, and/or altitude. The location coordinate may also be a GPS coordinate transmitted from a GPS satellite.

A 'location area' may refer to an area including a location coordinate. For example, the location area may be an area surrounding the location coordinate. That is, the location area may refer to an area that includes location information and is extended to a certain distance with respect to the location information. For example, a location area may be a name of an area that is specified by an address or a building, such as Avenue 1, District 1, or Site 1. It should be understood that various methods and names may be used to set the location area. For example, the location area can be set to an area that has a certain radius (e.g., 500 m) with respect to a current location, instead of an address.

'Location information' may refer to information regarding the location coordinate and location area. That is, 'location information' may refer to any piece of information that can indicate a current location of a portable terminal.

'Service information' may refer to information regarding any service that service providers or contents providers can provide via a communication network. Service information may include services that can be used by a user according to the user's request. Examples of service information include, but are not limited to, coupon information, information regarding well-known stores and restaurants, event information, performance information, and/or movie theater information. A coupon information service may be a service where a user identifies and downloads a coupon via the user's portable terminal. Restaurant information service may be a service where a corresponding restaurant may provide current information (e.g., waiting time and/or a menu) and may allow a user to reserve a table at the user's desired time. It should be understood that other pieces of service information may similarly be applied. It should be understood that the service information may include all pieces of information a portable terminal can use in an area where the portable terminal is currently located. For example, the service information can include any information (and digital contents) acquired via a communication network.

In the following description, exemplary embodiments of the present invention are described in detail with reference to the accompanying drawings.

Figure 1:
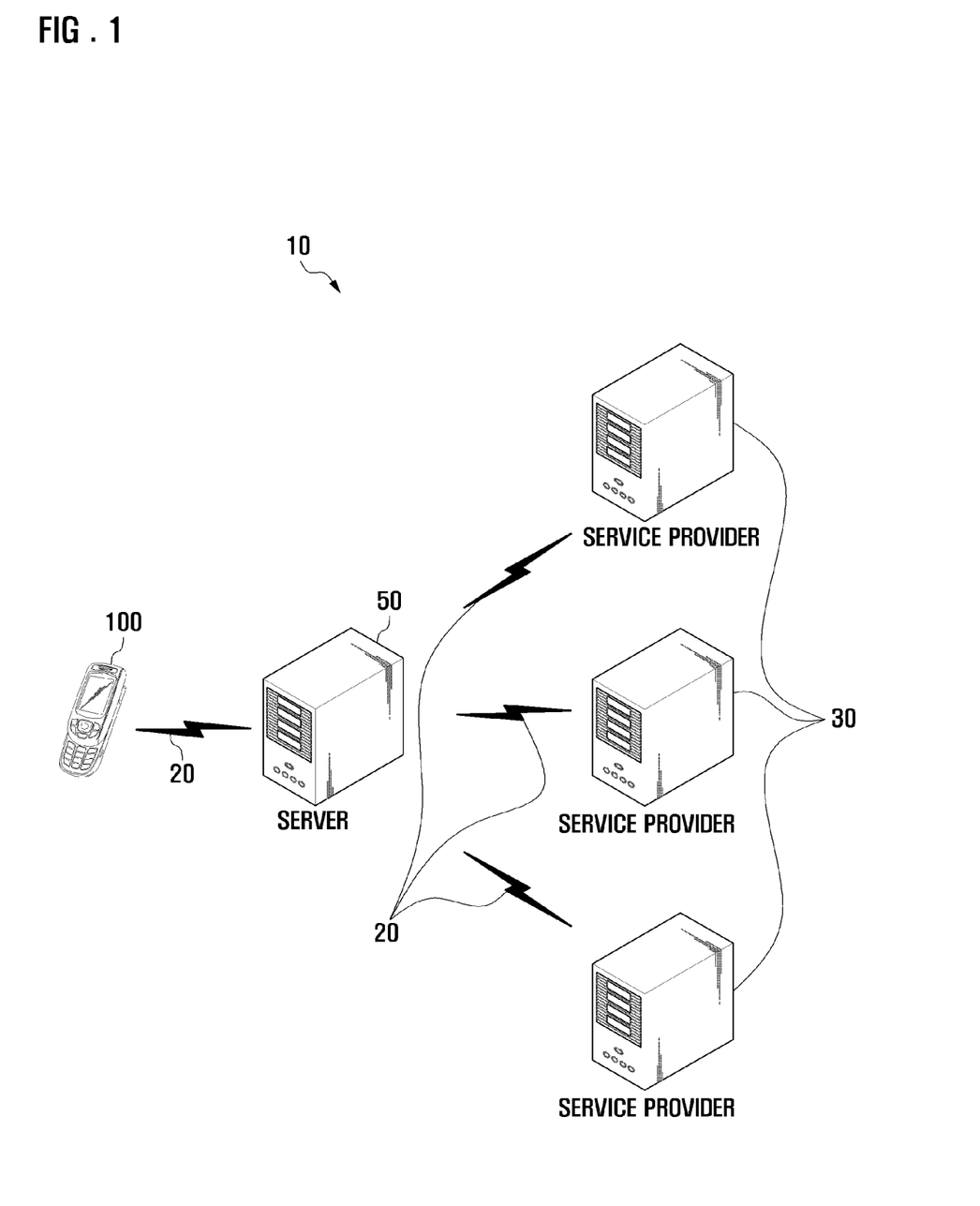
FIG. 1 is a schematic view illustrating a system for providing service information using location information associated with a portable terminal according to an exemplary embodiment of the present invention.

FIG. 1 is a schematic view illustrating a system for providing service information using location information associated with a portable terminal according to an exemplary embodiment of the present invention.

Referring to FIG. 1, the service information providing system 10 may include a portable terminal 100, a server 50, a service provider 30, and a communication network 20.

The communication network 20 may include a mobile communication network and/or a wired communication network. In general, the communication network 20 may refer to any communication network that can perform signal transmission and reception between the portable terminal 100 and the server 50, and between the server 50 and the service provider 30. The communication network may be connected to a variety of communication components, such as, for example, base stations and/or switching offices. Technology related to communication networks is well known and a detailed description of communication networks will therefore be omitted herein.

The service provider 30 may provide service information to the server 50, via the communication network 20, in response to a request of the server 50. The service provider 30 may provide contents and may be implemented using one or more service providers.

The server 50 may store a variety of contents and service information in a database and may provide corresponding service information to the portable terminal 100 in response to a request of the portable terminal 100. The server 50 may periodically receive location information associated with the portable terminal 100. If the location information changes, the server 50 may acquire service information corresponding to the changed location information and may subsequently transmit the service information to the portable terminal 100.

In some cases, each time the server 50 requires information (e.g., receives changed location information), the server 50 may request and acquire service information from the service providers 30. In some cases, the server 50 may periodically communicate with the service providers 30, may automatically update service information if the service information is new, and may store the updated service information therein. After that, if the server 50 requires information (e.g., receives changed location information), the server 50 can directly provide corresponding service information to the portable terminal 100. Accordingly, the server 50 can rapidly provide service information corresponding to the location information associated with the portable terminal 100.

The portable terminal 100 may transmit its location information to the server 50 via the communication network 20. In some cases, the portable terminal may transmit its location information to the server 50 upon request. In other cases, the portable terminal may periodically transmit its location information to the server 50.

The portable terminal 100 may acquire a location coordinate regarding its current location using a global positioning system (GPS) receiver. In some cases, the service information providing system may further include a GPS satellite that transmits GPS signals to a GPS receiver (not shown in the Figures).

The portable terminal 100 may display a list of one or more pieces of service information corresponding to the portable terminal's current location in response to a request by the user of the portable terminal 100. If the user selects one of the pieces of service information in the list, the portable terminal 100 may perform an operation related to corresponding service information as further illustrated in FIG. 2.

Figure 2:
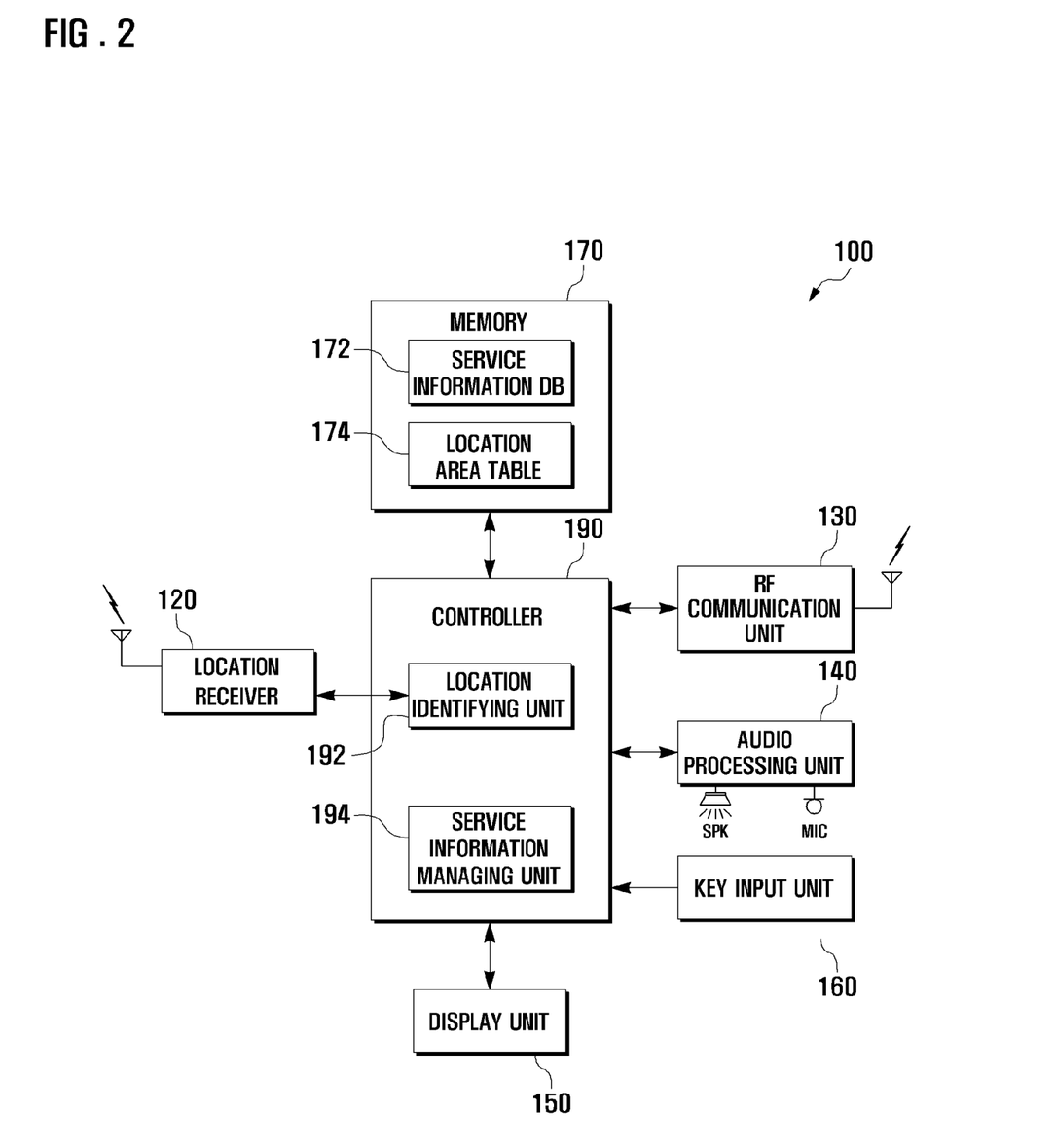
FIG. 2 is a schematic block diagram illustrating a portable terminal according to an exemplary embodiment of the present invention.

FIG. 2 is a schematic block diagram illustrating a portable terminal 100 according to an exemplary embodiment of the present invention.

The portable terminal 100 may include a location receiver 120, an RF communication unit 130, an audio processing unit 140, a key input unit 160, a display unit 150, a memory 170, and a controller 190.

The location receiver 120 may include a GPS receiver (not shown). The location receiver 120 may acquire information regarding a location coordinate of the portable terminal 100 via the GPS receiver. That is, the location receiver 120 may receive GPS signals from GPS satellites and may calculate coordinate data of a current location of the portable terminal based on the GPS signals. The GPS signals may include ephemeris and almanac of GPS satellites and GPS time.

The RF communication unit 130 may perform RF communication to transmit and receive data to and from other systems. The RF communication unit 130 may include an RF transmitter for up-converting a frequency of transmitted signals and for amplifying the transmitted signals. The RF communication unit 130 may also include a RF receiver for low-noise amplifying received RF signals and down-converting a frequency of the received RF signals. The RF receiver may receive data via an RF channel and may output the received data to the controller 190. The RF communication unit 130 may also receive data output from the controller 190 and may transmit the received data via the RF channel.

The audio processing unit 140 may include a codec (i.e., coder and decoder). The codec may include a data codec that can process packet data and an audio codec that can process audio signals, such as, for example, a voice signal. The audio codec may convert digital audio data, received by the controller 190 via the RF communication unit 130, during a call, to analog audio signals and may output the audio signals through a speaker. The audio codec may also convert analog audio signals, received via a microphone, to digital audio data and may then output the digital audio data to the controller 190.

The key input unit 160 may receive a user's operation signals for controlling the portable terminal 100 and may output the operation signals to the controller 190. For example, the key input unit 160 may include function keys (not shown) for controlling the operation of the portable terminal 100 and a plurality of input keys (not shown) for inputting numerical or character information.

The display unit 150 may display data, received from the controller 190, on a screen. The display unit 150 may be implemented using various suitable methods and devices, such as, for example, a liquid crystal display (LCD). If the display unit 150 is an LCD, the display unit 150 may further include an LCD controller, a LCD memory for storing data, and/or an LCD device. Additionally, a touch screen may also be used as an input unit.

The memory 170 may include a program memory and data memories. The program memory may store programs for controlling operations of the portable terminal 100. The data memories may store data generated while the programs are executed. In some cases, the memory 170 can store data related to a variety of contents. For example, the memory 170 may include a service information database 172 for storing service information from the server 50 and a location area table 174 for showing a location area corresponding to a location coordinate.

Figure 3:
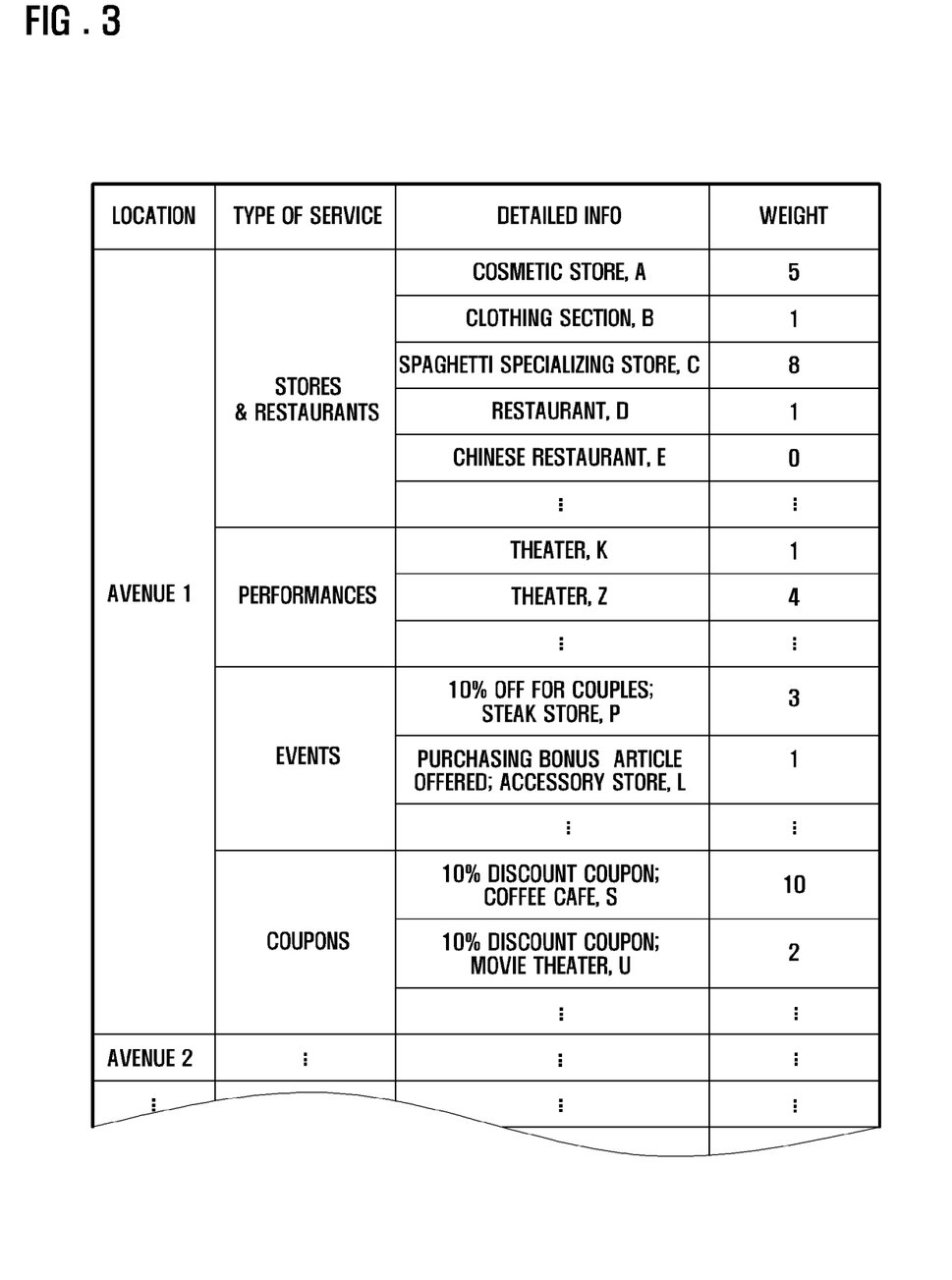
FIG. 3 is a table that describes a structure of a service information database according to an exemplary embodiment of the present invention.

FIG. 3 is a table that describes a structure of a service information database 172 according to an exemplary embodiment of the present invention.

Referring to FIG. 3, the service information DB 172 may include fields, such as LOCATION, TYPE OF SERVICE, DETAILED INFORMATION, and WEIGHT.

The LOCATION field may be used to set a location area corresponding to a location coordinate. The location coordinate can be identified through GPS coordinate information acquired using the location receiver 120. The location area can be identified through a location area table 174, based on the acquired location coordinate. In some cases, the location area may be classified with respect to an address. Therefore, if the portable terminal 100 is located at a place in Avenue 1, the place as a location area may be set to 'Avenue 1.'

The TYPE OF SERVICE field may be used for setting types of service information based on respective locations. Examples of the type of service, include but are not limited to, stores and restaurants, performances, events, and/or coupons. It should be understood that the TYPE OF SERVICE field may provide a variety of service information.

The DETAILED INFORMATION field may be used for setting actual service information included in a corresponding type of service. The actual service information may refer to information a user can recognize and use. For example, actual service information may include, well-know stores, restaurants, price information regarding food in a corresponding restaurant, theaters showing a performance, ticket prices for the performance, the time schedule of performance, and/or information regarding coupons available in restaurants and stores. It should be understood that various type of detailed information may be provided.

The WEIGHT field may be used to set a weight for pieces of service information included in the field of detailed information. In some cases, the weight may increase according to a frequency of user selection (i.e., how many times the user uses the service information). For example, the more frequently the user may select and/or use service information, the higher the weight of the service information is set.

According to exemplary embodiments, titles associated with corresponding pieces of service information may be described in the field of detailed information. Detailed contents associated with each piece of service information may be stored separately. It should be appreciated that various other fields may be included in the service information DB 172, and that the service information DB 172 is not limited the fields described above. For example, the service information DB 172 may include other fields, such as a service provider and/or service information detailed content.

Referring to memory 170, the location area table 174 is a table that may provide a location area corresponding to a location coordinate. For example, when a location coordinate of a portable terminal 100 is acquired, the location identifying unit 192 may identify a current location area of the portable terminal 100 using the location area table 174.

The controller 190 may control one or more operations of the portable terminal 100. The controller 190 may include a location identifying unit 192 and a service information managing unit 194. The location identifying unit 192 may acquire and transmit location information. The service information managing unit 194 may acquire service information, may store the service information in the service information DB 172, and may instruct the display unit 150 to display the service information in response to the portable terminal user's request.

The location identifying unit 192 may periodically acquire a location coordinate (e.g., a GPS coordinate) associated with a current location of a portable terminal 100 using the location receiver 120 according to instructions received from the controller 190. The location identifying unit 192 may also communicate with the server 50, via the communication network 20, and may transmit the acquired location information to the server 50.

When the service information managing unit 194 receives service information from the server 50, the service information managing unit 194 may check whether to update service information with the received service information. If an update is needed, the service information managing unit 194 updates the service information DB 172 with the received service information therein and/or stores the received service information therein.

The service information managing unit 194 may display, in response to a user's request, a list of service information corresponding to a current location of the portable terminal on the display unit 150. The list of service information may be based on pieces of service information stored in the service information DB 172. The service information managing unit 194 may prioritize pieces of service information with respect to the weight set in the service information DB 172, and may list the pieces of service information on the display unit 150.

When a user selects one of the pieces of service information in the list, the service information managing unit 194 may perform an operation corresponding to the selected service information and may increase the weight of the selected service information.

In the following description, a service information providing method using location information will be described in detail. Through the following description of the service information providing method, the configuration and operation of the service information providing system 10 and the portable terminal 100 described above may become more apparent.

Figure 4:
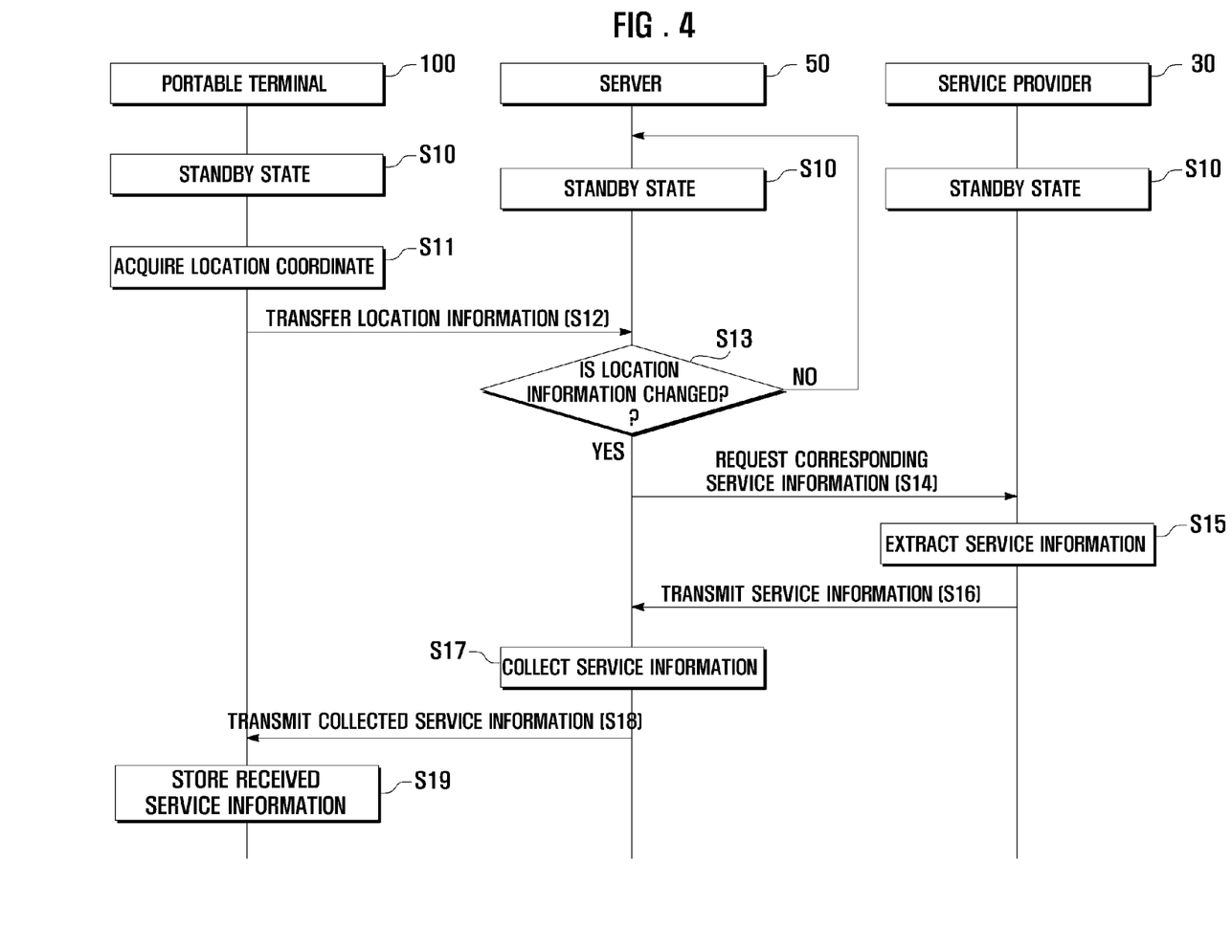
FIG. 4 is a signal flow chart describing a method for providing service information using location information regarding a portable terminal according to an exemplary embodiment of the present invention.

FIG. 4 is a signal flow chart describing a method for providing service information using location information associated with a portable terminal according to an exemplary embodiment of the present invention.

Referring to FIG. 4, the portable terminal 100 may be switched on and may be operating in an idle state (S10).

The location identifying unit 192 may acquire a location coordinate associated with a current location of the portable terminal 100 via the location receiver 120 (S11). The location coordinate of the portable terminal 100 may be periodically acquired after a certain period of time (e.g., 1 minute, 10 minutes) by the location identifying unit 192. When the location identifying unit 192 has acquired a location coordinate at S11, the location identifying unit 192 may transmit the acquired current location coordinate (e.g., location information) of the portable terminal 100 and a location area corresponding to the location coordinate to the server 50 (S12).

S11 and S12 may be repeated, so that the server 50 may periodically receive location information of the portable terminal 100 from the portable terminal 100.

When the server 50 receives location information of the portable terminal 100, the server 50 may determine whether the current location area according to the currently received location information associated with the portable terminal 100 has changed compared to a previous location area (S13). If the server 50 ascertains that the current location area according to the currently received location information is identical to a previous location area at S13, the server 50 may conclude that the portable terminal 100 is still located at the same area. Accordingly, the server may return to a standby state S10.

However, if the server 50 ascertains that the current location area (e.g., Avenue 1) according to the currently received location information is not identical to a previous location area (e.g., Avenue 2) at S13, the server 50 may acquire service information corresponding to the current location area. For example, the server 50 may request service information from a service provider 30 (S14). The server 50 may also provide information regarding a location area where the portable terminal 100 is located to the service provider 30.

The service provider 30 may extract service information related to the location area (e.g., Avenue 1) provided by the server 50 (S15). After that, the service provider 30 may transmit the extracted service information to the server 50 (S16).

The server 50 can acquire a variety of pieces of service information related to the the current location area (e.g., Avenue 1) of the portable terminal from at least one service provider 30 and may collect the pieces of service information (S17). In some cases, the collected pieces of service information may have a structure that is similar to that of the service information DB 172 of the portable terminal 100. In other cases, the collected pieces of service information may have a structure that is different to that of the service information DB 172.

Next, the server 50 may transmit the collected service information to the portable terminal 100 (S18).

The portable terminal can receive service information via the service information managing unit 194 and can store the service information in the service information DB 172 (S19). The receiving and storing operations at S19 are described in further detail below, with reference to FIG. 5.

Figure 5:
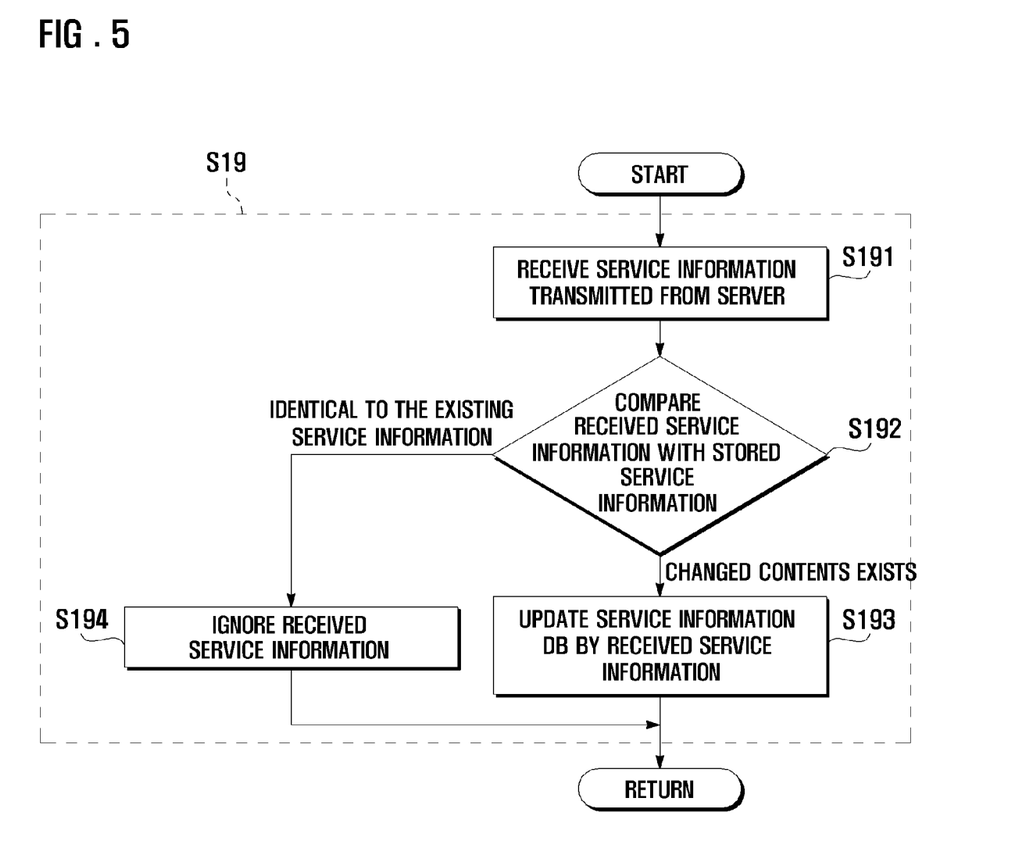
FIG. 5 is a flow chart describing a process of storing service information regarding a portable terminal according to an exemplary embodiment of the present invention.

FIG. 5 is a flow chart describing a process of storing service information regarding a portable terminal according to an exemplary embodiment of the present invention.

When the service information managing unit 194 receives service information from the server 50 (S191), the service information managing unit 194 may determine whether the received service information is identical to service information stored in the service information DB 172 (S192). If the service information managing unit 194 ascertains that the received service information is identical to the previously stored service information at S192, the service information managing unit 194 may ignore (or delete) the received service information (S194).

However, if the service information managing unit 194 ascertains that the received service information differs from the previously stored service information at S192, the service information managing unit 194 may update the service information DB 172 with the received service information (S193). In some cases, the service information DB 172 may only update the DETAILED INFORMATION field. In other cases, if a type of service is added or deleted, the service information DB 172 may also update the TYPE OF SERVICE field. If service information regarding the same location area has not been stored, the service information managing unit 194 may add information, which matches a corresponding location area based on the received service information, to the service information DB 172.

Steps S10 to S19 shown in FIG. 4 may be repeatedly performed as the portable terminal 100 moves. That is, when the user carries the portable terminal 100 and is mobile, S10 to S19 may be repeatedly performed. Accordingly, pieces of service information associated with location areas in the user's movement route are stored in the service information DB 172 of the portable terminal 100.

As described above, the portable terminal 100 can automatically store service information regarding the location area where the portable terminal 100 is or was located. That is, although the portable terminal user does not access the Internet and search for service information regarding the user's periphery, the portable terminal 100 can provide the most recent pieces of service information regarding the place where the user frequently visits so that the user can easily acquire the location information.

In the following description, a process of using the service information according to the process described above is explained in detail with reference to FIG. 6.

Figure 6:
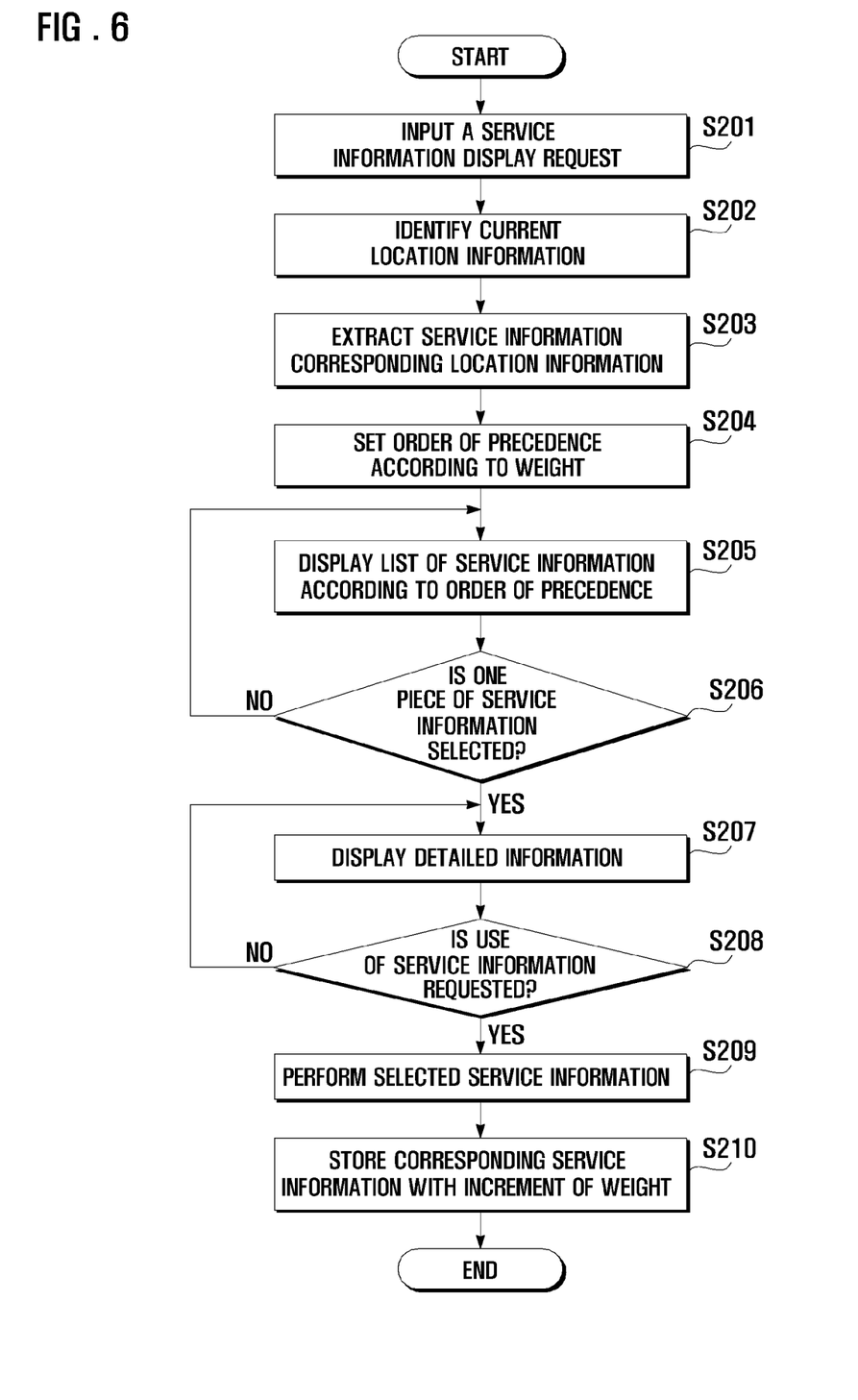
FIG. 6 is a flow chart describing a process of using service information according to an exemplary embodiment of the present invention.

FIG. 6 is a flow chart describing a process of using service information according to an exemplary embodiment of the present invention.

Referring to FIG. 6, a user may input a service information display request to the portable terminal 100, which could be in an idle state (S201). The location identifying unit 192 may identify location information (e.g., a location coordinate) associated with a current location of the portable terminal 100 via the location receiver 120 (S202). Next, the service information managing unit 194 may extract service information corresponding to the identified location information (S203). Accordingly, the service information managing unit 194 may identify a location area corresponding to the identified location coordinate via the location area table 174. If the location area where the portable terminal 100 is currently located is, for example, Avenue 1, the service information managing unit 194 may extract all pieces of service information whose location field is set to Avenue 1, from the service information DB 172. Next, the service information managing unit 194 may prioritize the pieces of extracted service information (S204). The service information managing unit 194 may check the weight of all pieces of extracted service information and allocate an order of precedence to the pieces of service information according to their weight. For example, referring to FIG. 3, the highest order of precedence is set to a coffee cafe, S, with respect to a 10% discount coupon, and then the next highest order of precedence is set to a spaghetti specializing store, C. If pieces of service information have the same weight, the order of precedence may be determined according to an order of the names of corresponding items or the most recently selected order. It should be understood that the order of precedence can be determined using various suitable methods. When the order of precedence regarding all pieces of service information is set, the service information managing unit 194 may display a list of pieces of service information according to the order of precedence on the display unit 150 (S205).

Figure 7A:
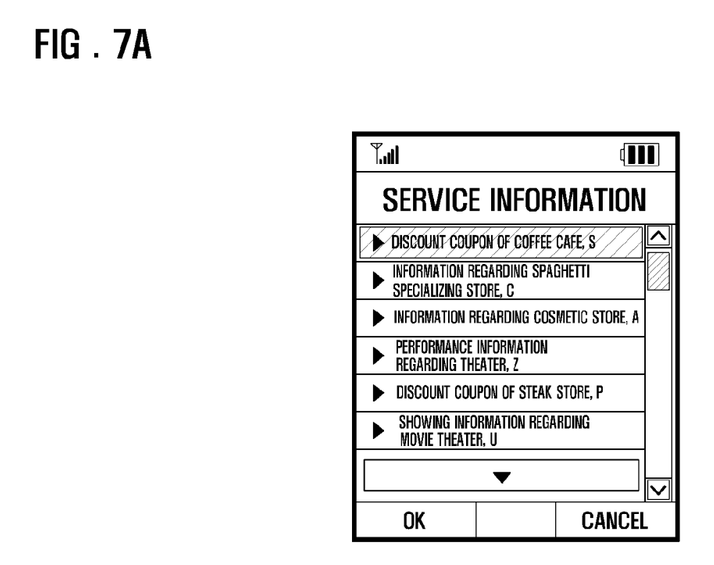
FIG. 7A, FIG. 7B, and FIG. 7C show screens of a portable terminal according to exemplary embodiments of the present invention.
Figure 7B:
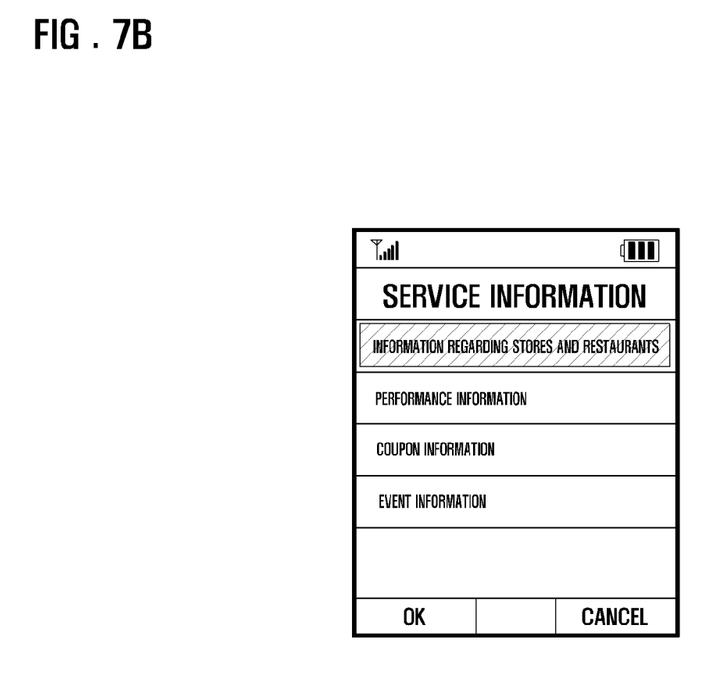

An example of a displayed list of pieces of service information is shown in FIG. 7A. FIG. 7A illustrates a list in which all pieces of service information, regardless of the type of service information, are displayed according to the order of precedence. However, it should be understood that the display may be modified in various suitable ways. For example, the types of services may first be displayed in a list or with icons, as shown in FIG. 7B, at S205 according to a user's request and then. If a user selects one of the items (e.g., store and restaurant information), pieces of service information corresponding to the selected item may be displayed in a list according to the order of precedence, as shown in FIG. 7C.

Furthermore, if the service information DB 172 includes a field of service provider, the service information DB 172 may provide service information, based on service providers 30, to the user. In addition, when respective service items may be displayed on the display unit 150, the weight of a corresponding item may also be displayed as a number or in a table.

Figure 7C:
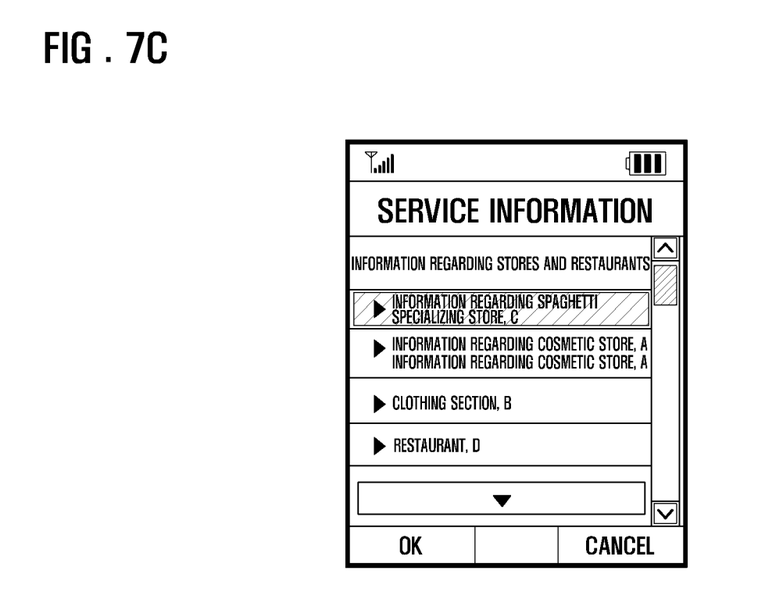

As such, when the pieces of service information are displayed on the display unit 150 at S205, the user can select one of them in the list, as shown in FIG. 7A or 7C, (S206). The service information managing unit 194 may display detailed information, showing details of the selected service information, on the display unit 150 (S207). After that, if the user requests to use corresponding service information (S208), the service information managing unit 194 may perform a service corresponding to the user's selected service information (S209). If no request is received, the portable terminal 100 may continue to display the detailed information.

For example, when the pieces of service information are displayed in the list as shown in FIG. 7A, at S205, and the user selects a 'discount coupon of coffee cafe, S,' therefrom, at S206, the service information managing unit 194 may display detailed information regarding the selected service information (e.g., item: the discount coupon) at S207. After that, the user may request to use the selected service information (i.e., coupon download) at S208. Accordingly, the service information managing unit 194 may access the server 50 corresponding to the selected service information, may download a corresponding coupon therefrom, and may store the coupon in the portable terminal 100 at S209. In some cases, after completing the steps described above, the service information managing unit 194 may conclude that the corresponding service information (e.g., coupon service) was used.

According to another example, when pieces of service information are displayed in the list as shown in FIG. 7C, at S205, and the user selects 'restaurant, D,' therefrom, at S206, the service information managing unit 194 may display detailed information regarding the selected service information (e.g., item: restaurant, D) at S207. After that, the user may request to use the selected service information (e.g., table reservation at a restaurant) at S208. The service information managing unit 194 may access the server 50 corresponding to the selected service information and reserve a table in the restaurant, D, at the user's requested time at S209. Subsequently, the service information managing unit 194 may conclude that the corresponding service information (i.e., Restaurant D) was used.

According to some exemplary embodiments, use of service information means that a user substantially uses corresponding service information. If, for example, the user uses particular service information, the data related to the used service information may be stored in the memory 170 so that the data can be re-used by the user. For example, in the example described above, data associated with the coupon and the table reservation in a restaurant may be stored in the memory 170 (or the service information DB 172). From the data, information and statistics regarding service items that the user frequently used can be acquired.

If particular service information is selected, the service information managing unit 194 may assign a weight to the selected service information (S210). That is, the service information managing unit 194 may increase the weight of the selected service information by one in the service information DB 172. Therefore, service information frequently used by a user may have greater weight and service information occasionally used by a user may have lower weight. When the pieces of service information are shown in the list at S205, they may be displayed in order of precedence according to how frequently the information is used by the user.

In some cases, the process of assigning weight at S210 may not be performed after the process of performing service information at S209. For example, weight may also be assigned after the user selects corresponding service information and identifies corresponding detailed contents at S207. In such cases, the process of assigning the weight of S210 may be performed between S207 and S208.

Furthermore, if S207, S209 and S210 are sequentially performed, the process of assigning weight at S209 may be performed more than once so that the weight is repeatedly increased (e.g., doubled, tripled).

According to some exemplary embodiments of the present invention, all pieces of service information received from the server 50 may be stored in the service information DB 172. The service information DB 172 of the portable terminal 100, however, has a storage capacity limit, so the service information DB 172 can only store a certain amount of service information. As such, if the amount of service information to be stored in the service information DB 172 is restricted, it may be difficult to store all pieces of received service information therein. Accordingly, at S19, the portable terminal 100 may not store pieces of service information associated with all location areas but only pieces of service information corresponding to a current location, as shall be explained in further detail with reference to FIG. 8.

Figure 8:
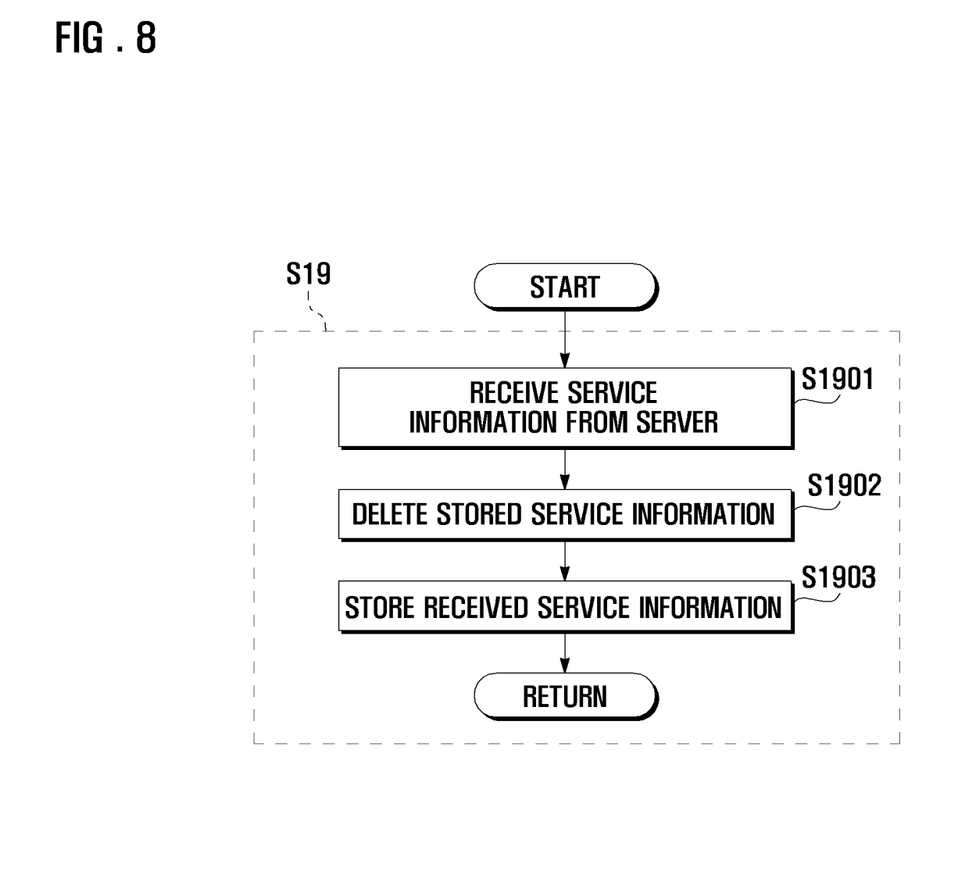
FIG. 8 is a flow chart illustrating a process of storing service information regarding a portable terminal according to an exemplary embodiment of the present invention.

FIG. 8 is a flow chart illustrating a process of storing service information regarding a portable terminal according to an exemplary embodiment of the present invention.

Referring to FIG. 8, the service information managing unit 194 of the portable terminal 100 may receive service information from the server 50 (S1901). As noted above, after location information associated with the portable terminal 100 has changed, the server 50 may collect pieces of service information and then transmit the pieces to the portable terminal 100. Therefore, transmission of service information to the portable terminal 100 at S18 may indicate that the location area where the portable terminal 100 is located has changed. The service information managing unit 194 may then store the received service information.

As noted above, the service information DB 172 may have a storage capacity limit. If the service information DB 172 has filled its storage capacity by storing pieces of service information regarding other location areas, the service information DB 172 may not be able store newly received service information. Therefore, when the service information managing unit 194 receives service information from the server 50 at S1901 (that is, if the location area of the portable terminal 100 has been changed), the service information managing unit 194 may first delete pieces of service information stored in the service information DB 172 (S1902). For example, pieces of service information associated with locations where the portable terminal 100 was located in the past are deleted. Accordingly, the service information DB 172 can secure a certain amount of storage space to store newly received pieces of service information.

After that, the service information managing unit 194 may store pieces of service information received at S192 in the service information DB 172 (S1903). The service information DB 172 may store pieces of newly received service information, so that the user may use service information corresponding to the current location from S201 to S210 described in FIG. 6.

In some cases, pieces of stored service information may be deleted automatically regardless of the user's wishes. In other cases, as explained in further detail below, pieces of stored service information can be deleted or stored according to the user's selection.

When service information is received at S1901, the service information managing unit 194 may display a message (e.g., a pop-up message) on the display unit 150 inquiring whether a user wishes to delete pieces of stored service information. The user can request to delete or continue storing the stored service information at S1902. Furthermore, the service information managing unit 194 can also display a message on the display unit 150 inquiring whether a user wishes to store pieces of newly received service information at S1903. Therefore, the service information managing unit 194 may only store pieces of received service information if the user requests storage.

In some cases, if the service information DB 172 has a relatively small storage capacity, the service information DB 172 may automatically delete pieces of stored service information every time new pieces of service information are received. In other cases, if the service information DB 172 has a relatively large storage capacity, the service information DB 172 can store pieces of newly received service information without deleting the pieces of stored service information. If the service information DB 172 is completely full and unable to store further service information, the service information DB 172 can delete pieces of service information from the oldest stored service information or from the least frequently used information to secure storage space and can then store pieces of newly received service information therein.

As described above, the method and system for providing service information using location information may periodically acquire and store information related to a location of a portable terminal and may display the location information in response to a user's request, so that the user can easily identify and use new service information regarding a place where the user is located. That is, the method and system can provide user-oriented information. Furthermore, exemplary embodiments provide a method and system that can assign weight to pieces of service information according to how frequently the user uses the information. Therefore, when pieces of service information are shown in a list, they may be displayed according to the order of weight, thereby improving user convenience.

The portable terminal 100 described herein may include a location identifying unit 192 and may acquire location information through the location identifying unit 192. It should be understood that other suitable methods may be used to acquire location information. For example, location information may be acquired using a location based service (LBS). In that case, although the portable terminal may not include the location identifying unit 192, as shown in FIG. 2, the server 50 can periodically acquire location information regarding the portable terminal through the LBS.

In other cases, when the server 50 does not use a LBS or the GPS receiver, location information may be acquired from a mobile communication provider, such as a base station. In such cases, the server 50 may periodically acquire location information associated with the portable terminal 100 from the mobile communication provider.

As noted above, the server 50 may detect whether a location of a portable terminal 100 has changed. It should, however, be understood that other suitable methods and variations may be used to determine whether the location of the portable terminal 100 has changed. For example, the location identifying unit 192 of the portable terminal 100 may periodically acquire location coordinates of the portable terminal 100 and may determine whether the location area of the portable terminal 100 has changed. If the location area of the portable terminal 100 has changed, the location identifying unit 192 may transmit location information to the server 50.

Also as noted above, in some exemplary embodiments, pieces of service information are displayed only if a user requests. It should, however, be understood that other criteria and methods may be used to display the pieces of service information. For example, pieces of service information (e.g., service information regarding a movie theater U if the user is close to the movie theater U) corresponding to a current location of the user may automatically be displayed on the idle state screen of the portable terminal 100. In that case, the pieces of service information may be displayed according to the order of precedence (i.e., weight).

As noted above, in some exemplary embodiments, service information corresponding to location information may be provided to the portable terminal 100. It should, however, be understood that the present invention is not limited to these exemplary embodiments. For example, any electronic device that can transmit data and acquire location information, via a communication network, can also use the service information.

Specific terms described herein should not be construed as limiting the scope of the present invention since the terms are used for a clear explanation and understanding. Although exemplary embodiments of the present invention have been described in detail hereinabove, it should be understood that many variations and modifications of the basic inventive concept herein described, which may be apparent to those skilled in the art, will still fall within the spirit and scope of the exemplary embodiments of the present invention as defined in the appended claims and their equivalents.

What is claimed is:

1. A method for providing service information, comprising:
   acquiring, by a server, location information associated with a portable terminal;
   determining whether a location of the portable terminal has changed based on the acquired location information;
   in response to determining that the location of the portable terminal has changed, acquiring, by the server, the service information corresponding to the location information from at least one service provider;
   transmitting, by the server, the service information to the portable terminal,
   wherein pieces of the transmitted service information are displayed in a form of a prioritized list for user selection, the prioritized list being provided based on weighted metrics associated with a user and the pieces of the transmitted service information,
   wherein the weighted metrics comprise:
      recentness of selection of the pieces of the transmitted service information by the user; and
      at least one of frequency of use of the pieces of the transmitted service information by the user and frequency of selection of the pieces of the transmitted service information by the user, and
   wherein at least one of the weighted metrics are increased in response to selection of one of the listed pieces of service information by the user.

2. The method of claim 1, wherein the service information comprises coupon information, information regarding stores and restaurants, and/or event information.

3. The method of claim 1, wherein storing the service information comprises:
   determining, by the portable terminal, whether to update previously stored service information based on the received service information; and
   storing, in response to a determination to update the previously stored service information, the received service information.

4. The method of claim 3, wherein storing the currently received service information comprises:
   deleting, by the portable terminal, the previously stored service information.

5. The method of claim 4, wherein deleting the previously stored service information comprises:
   displaying a message providing an option to delete service information; and
   deleting, in response to selection of the option, the previously stored service information.

6. The method of claim 1, further comprising:
   increasing, in response to use, selection, or use and selection of one of the listed pieces of service information, a weighted metric associated with the used, selected, or used and selected piece of service information.

7. The method of claim 1, wherein the pieces of the transmitted service information are further displayed to the user of the portable terminal based on one or more characteristics of the pieces of the transmitted service information.

8. The method of claim 1, further comprising:
   receiving, by the server, a request associated with the selected service information; and
   transmitting, to the portable terminal, additional service information corresponding to the request.

9. A system to provide service information, the system comprising:
   a portable terminal; and
   a server configured to:
      receive location information associated with the portable terminal,
      determine whether a location of the portable terminal has changed based on the received location information,
      acquire service information corresponding to the location information in response to the determination that the location of the portable terminal has changed, and
      transmit the service information to the portable terminal,
   wherein the portable terminal is configured to:
      store the service information received from the server,
      display pieces of the service information in a prioritized list for user selection, the prioritized list being provided based on weighted metrics associated a user and the pieces of the transmitted service information, the weighted metrics comprising recentness of selection of the pieces of the transmitted service information by the user, and at least one of frequency of use of the pieces of the transmitted service information by the user and frequency of selection of the pieces of the transmitted service information by the user, and
      increase, in response to selection of one of the listed pieces of service information by the user, a weight of the selected piece of service information.

10. The system of claim 9, wherein the portable terminal is further configured to:
    determine whether to update previously stored service information based on the received service information; and
    store the received service information in response to a determination to update the previously stored service information.

11. The system of claim 10, wherein the portable terminal is further configured to delete the previously stored service information.

12. The system of claim 9, wherein the server is further configured to receive the location information according to a location based service (LBS).

13. A portable terminal, comprising:
    a location identifying unit configured to:
       acquire location information associated with a location of the portable terminal, and
       transmit the location information to a server; and
    a service information managing unit configured to:
       store service information received from the server, and
       control, in response to a request, presentation of pieces of the service information on a display in a prioritized list for user selection, the prioritized list being provided based on weighted metrics associated with a user and the pieces of the service information, and the weighted metrics comprising recentness of selection of the pieces of the transmitted service information by the user, and at least one of frequency of use of the pieces of the transmitted service information by the user and frequency of selection of the pieces of the transmitted service information by the user, wherein, in response to selection of one of the pieces of the service information by the user, the service information managing unit is further configured to increase a weight of the selected piece of the service information.

14. The portable terminal of claim 13, wherein, in response to receipt of the service information from the server, the service information managing unit is further configured to:

delete previously stored service information; and
  store the received service information.

15. The portable terminal of claim 13, wherein the service information managing unit is further configured to:

control presentation of the pieces of the service information further based on one or more characteristics of the pieces of the service information.

\* \* \* \* \*